(12) United States Patent
Brehm et al.

(10) Patent No.: US 7,857,391 B2
(45) Date of Patent: Dec. 28, 2010

(54) ADJUSTMENT FITTING

(75) Inventors: Horst Brehm, Bischberg (DE); Georg Scheck, Weitramsdorf (DE); Heiko Löhnert, Grosswalbur (DE); Andreas Theil, Meeder (DE)

(73) Assignee: Brose Fahzeugteile GmbH & Co., Coburg (DE)

( * ) Notice: Subject to any disclaimer, the term of this patent is extended or adjusted under 35 U.S.C. 154(b) by 106 days.

(21) Appl. No.: 12/066,242

(22) PCT Filed: Jul. 7, 2006

(86) PCT No.: PCT/EP2006/006639

§ 371 (c)(1),
(2), (4) Date: Sep. 15, 2008

(87) PCT Pub. No.: WO2007/031134

PCT Pub. Date: Mar. 22, 2007

(65) Prior Publication Data

US 2009/0051203 A1  Feb. 26, 2009

(30) Foreign Application Priority Data

Sep. 9, 2005  (DE) .................. 20 2005 014 192 U (51) Int. Cl.
*B60N 2/02* (2006.01)
(52) U.S. Cl. .................................. 297/361.1
(58) Field of Classification Search ............. 297/361.1, 297/362; 16/221, 235
See application file for complete search history.

(56) References Cited

U.S. PATENT DOCUMENTS

| 4,025,109 A | | 5/1977 | Klingelhofer et al. |
| 4,371,207 A | * | 2/1983 | Wilking et al. ......... 297/344.15 |
| 4,538,855 A | * | 9/1985 | Peetz et al. .................. 297/362 |
| 4,781,416 A | * | 11/1988 | Johnson et al. ............. 297/362 |
| 4,836,606 A | * | 6/1989 | Werner ........................ 297/362 |

FOREIGN PATENT DOCUMENTS

| DE | 29 21 588 | 12/1980 |
| DE | 103 28 300 | 2/2005 |
| DE | 195 27 374 | 2/2005 |

* cited by examiner

*Primary Examiner*—Milton Nelson, Jr.
(74) *Attorney, Agent, or Firm*—Scott T. Weingaertner; Joseph D. Eng, Jr.; King & Spalding LLP

(57) ABSTRACT

The invention relates to an adjustment fitting for a vehicle seat. The adjustment fitting includes a first fitting part and a second fitting part connected by a wobble mechanism. The wobble mechanism includes a central wheel that is rotatable about a central axis and is connected to the first fitting part. A revolving wheel is arranged in the interior of the central wheel eccentrically with respect to the central axis and is connected to the second fitting part. The central wheel and the revolving wheel form, with respect to each other, an eccentric receiving space in which a first eccentric and a second eccentric are arranged rotatably in relation to each other. The revolving wheel engages in a play-free manner in the central wheel and with a transmission element that is rotatable about the central axis.

12 Claims, 6 Drawing Sheets

ADJUSTMENT FITTING

FIELD OF THE INVENTION

The invention relates to an adjustment fitting, in particular for a vehicle seat, with a first fitting part and a second fitting part which are connected to each other in a rotationally adjustable manner via a wobble mechanism.

BACKGROUND OF THE INVENTION

An adjustment fitting of the type mentioned at the beginning is used in particular for adjusting the backrest of a vehicle seat. For this purpose, for example, the first fitting part is connected to the backrest and the second fitting part is connected to the seat surface of the vehicle seat. The use of a wobble mechanism has been tried and tested here, since it constitutes a rotary connection which manages with comparatively few elements and at the same time comprises a gear mechanism.

Such an adjustment fitting which is described at the beginning is known, for example, from DE 29 21 588 A1. In this case, the wobble mechanism comprises a central wheel which is rotatable about a central axis, and a revolving wheel which is arranged in the interior of the central wheel eccentrically with respect to the central axis. The central wheel and the revolving wheel here form, with respect to each other, an eccentric receiving space in which a first eccentric and a second eccentric are arranged rotatably in relation to each other, as a result of which a variable eccentricity is formed. In order to actuate the wobble mechanism, a driver disk which is rotatable by means of an adjustment spindle is provided as the transmission element. The driver disk has cutouts which are in engagement with driver pins arranged on the eccentrics. Furthermore, a mechanically acting coupling element (spring) is provided which, in the inoperative state of the adjustment fitting, rotates the eccentrics in relation to each other in such a manner that their overall eccentricity is increased. By this means, the revolving wheel is brought into a position in which it engages in a play-free manner in the central wheel. When the driver disk is rotated, an eccentric is rotated in each case via the driver pin, thus reducing the overall eccentricity. By this means, the revolving wheel is brought into a position in which it engages with play in the central wheel. The revolving wheel can be rotated in relation to the central wheel via the driver disk in a manner such that it wobbles with revolving eccentricity. By this means, the first fitting part rotates relative to the second fitting part with a corresponding transmission ratio which is determined by the ratio of the number of teeth of the external toothing of the revolving wheel to the number of teeth of the internal toothing of the central wheel.

The adjustment fitting known from DE 29 21 588 A1 is free from play in its inoperative position, as a result of which rattling is avoided. However, this adjustment fitting is disadvantageously relatively stiff and has an actuating asymmetry with respect to the direction of rotation.

Further adjustment fittings which have a wobble mechanism and in which the revolving wheel rests in a play-free manner on the central wheel in an inoperative position are known from DE 195 27 374 C2 and DE 103 28 300 A1.

SUMMARY OF THE INVENTION

It is the object of the invention to provide an adjustment fitting with a wobble mechanism, which is as smooth-running as possible and is free from play in its inoperative position.

This object is achieved according to the invention for an adjustment fitting in that the transmission element is additionally mounted movably in the plane of the fitting parts, with the engagement mechanism essentially extending in the plane and, when actuated, acting on both carry-along mechanisms counter to the coupling element, as a result of which the eccentrics can be brought into a position with reduced overall eccentricity, in which the revolving wheel engages with play in the central wheel.

The invention is based here on the consideration that, in order to form a variable eccentricity, an inner and outer eccentric are arranged in the eccentric receiving space. In order to reduce the overall eccentricity formed by the two eccentrics, a relative movement of the two eccentrics with respect to each other has to take place. Since, apart from their shape, the inner eccentric and the outer eccentric differ in particular by means of their arrangement in the adjustment fitting, an asymmetry results in the sequence of movement if the inner eccentric is rotated in relation to the outer eccentric or else the outer eccentric is rotated in relation to the inner eccentric.

The invention recognizes, in a further step, that the asymmetry in the movement sequence can be eliminated if the two eccentrics are moved in relation to each other independently of the direction of movement. This takes place by the transmission element being mounted movably in the plane of the fitting parts and by the engagement mechanism essentially extending in the plane. By means of such a configuration, rotation of the transmission element in the plane of the fitting parts brings about a displacement and therefore overall a pivoting of the engagement mechanism, which can be used to actuate an eccentric counter to the direction of rotation. The mounting which is movable in the plane can be formed by a sliding bearing with a plurality of degrees of freedom in the plane. The engagement mechanism can also be displaceable, for example, in a predetermined longitudinal direction or along a slotted guide.

In a first advantageous refinement of the invention, the engagement mechanism is designed as a radially extending pointer, and the carry-along mechanism of the eccentrics is formed in each case by means of two structures each arranged on one side of the pointer. If the transmission means is rotated, then the radially extending pointer is first of all supported on a structure located in the direction of rotation in order then, owing to the longitudinal displaceability, to be tilted against an opposite structure. In comparison to an inoperative position, this tilted position of the pointer upon actuation leads to the structures moving apart, as a result of which the eccentrics are rotated in relation to each other. In the inoperative position, the eccentrics are pulled back again into the position with increased overall eccentricity because of the coupling element.

The eccentrics expediently each have an arm which extends radially beyond the circumference and on which the carry-along mechanism is arranged in each case. By this means, the available lever arm for the rotation of the two eccentrics in relation to each other is extended. This permits greater flexibility in the adaptation of the adjustment travel.

In a further advantageous refinement of the invention, the carry-along mechanism of the eccentrics is in each case formed by an essentially radially extending nipper limb, with the engagement mechanism comprising two structures which are spaced apart from each other in the radial direction and are arranged between the nipper limbs of the eccentrics. In this refinement, the nipper limbs are pulled toward each other by the coupling element, as a result of which the overall eccentricity of the two eccentrics is increased. If the transmission element is rotated, then the outer structure is first of all supported against the nipper limb located in the direction of rotation. As a consequence of the counterforce caused by the coupling element, the transmission element is displaced, as a result of which, given an appropriate configuration, the inner structure is moved counter to the direction of rotation against the further nipper limb. By this means, the two nipper limbs are opened in relation to each other irrespective of the direction of rotation of the transmission element, as a result of which the eccentrics rotate in relation to each other.

The effect counter to the direction of rotation can advantageously be increased if the nipper limb is thickened toward the structure in the vicinity of the center.

The ends of the nipper limbs expediently taper toward each other, with the play between the transmission element and the nipper limbs being eliminated by a radially acting adjusting element.

The transmission element advantageously has a stop for each nipper limb, with the nipper limbs each being arranged between the structures and the associated stop. The stop firstly prevents excessive rotation and secondly ensures that a rotation of the revolving wheel in relation to the central wheel is brought about via the transmission element.

The structures described can be of diverse configuration. The engagement mechanism can thus act on the respective carry-along mechanisms by means of a positive, nonpositive or frictional connection. In addition to a mechanical coupling, a magnetic or electric coupling is also conceivable. However, for an adjustment fitting which is composed of comparatively few mechanical elements, it is expedient in particular to form the structures as pins. In this case, the pins themselves can be adhesively bonded on or screwed on or can be formed from the respective element itself.

For the actuation of the adjustment fitting, it is expedient to provide a driving element with a driver for actuating the transmission means. In this case, the driving element can be driven by motor or else can be a simple hand wheel. In the case of the embodiment described, in which the carry-along mechanisms are designed as nipper limbs, it is advantageous if the adjusting element which presses the transmission element against the nipper limps is supported on the driver.

It is expedient to provide an elongated hole for the formation of the displaceability. In this case, the transmission element does not need to be inevitably mounted with the elongated hole on the central axis. This is not expedient in particular if the transmission element does not extend at all as far as the central axis.

For cost reasons, it is advantageous if the coupling element is formed by a mechanical spring.

DETAILED DESCRIPTION

Figure 1:
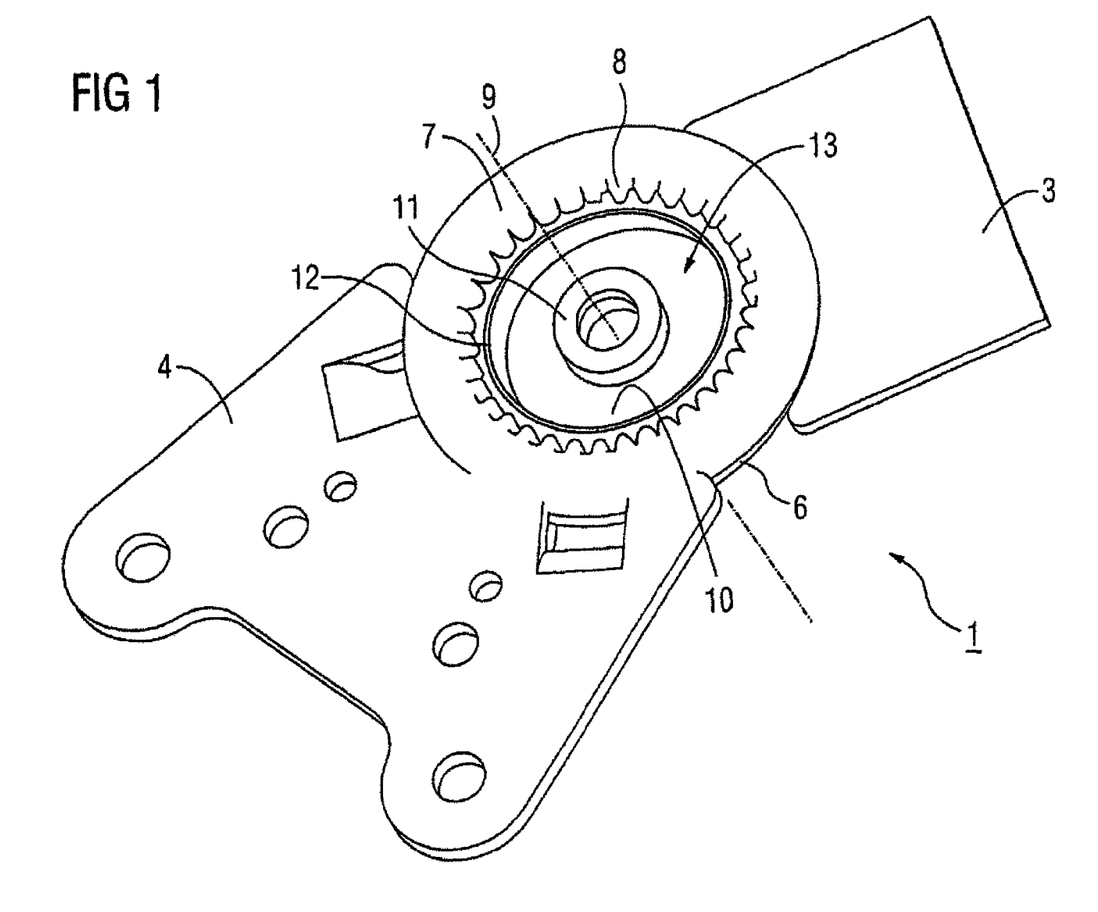
FIG. 1 shows an open adjustment fitting.

In order to explain the operation, FIG. 1 is an illustration of an open adjustment fitting 1 which comprises a first fitting part 3 and a second fitting part 4 which are connected to each other in a rotationally adjustable manner via a wobble mechanism. For this purpose, a central wheel 6 which has an internal toothing (not visible) is arranged on the first fitting part 3. To a certain extent, the central wheel 6 forms a cup-shaped structure into which a revolving wheel 7, which is connected to the second fitting part 4, is inserted. For this purpose, the revolving wheel 7 has an external toothing 8 which engages in the internal toothing of the central wheel 6. The rear side of the impressed external toothing 8 is visible.

The diameter of the external toothing 8 is slightly smaller than the diameter of the internal toothing of the central wheel 6. The revolving wheel 7 is therefore arranged eccentrically with respect to the central axis 9. When actuated, the second fitting part 4 therefore executes a wobbling movement in relation to the first fitting part 3, with the revolving wheel 7 rolling with a changing axis of rotation along the internal toothing of the central wheel 6.

A sleeve 11 is arranged centrally at the bottom 10 of the central wheel 6. The sleeve 11 forms an eccentric receiving space 13 together with the revolving wall 12 of the revolving wheel 7. When there is a wobbling movement of the revolving wheel 7 in the central wheel 6, the eccentricity of the receiving space 13 rotates to a certain extent about the central axis 9. In accordance with the size ratios illustrated, the eccentricity rotates at a speed ratio of approximately 35 times in relation to the relative rotation of revolving wheel 7 to central wheel 6.

Figure 2:
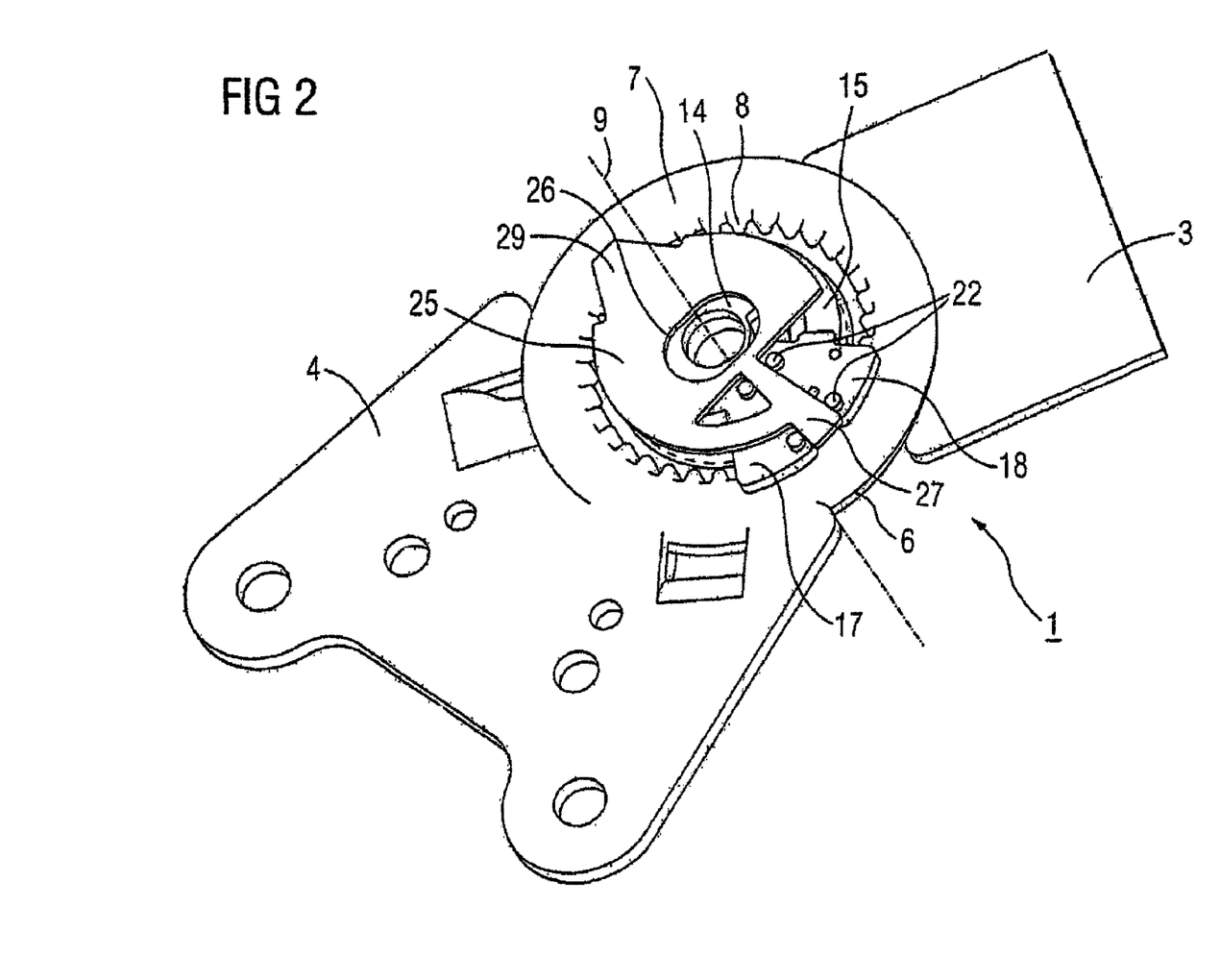
FIG. 2 shows the adjustment fitting according to FIG. 1 with the eccentrics inserted, in an inoperative position.

FIG. 2 shows the adjustment fitting 1 according to FIG. 1 with eccentrics 14 and 15 inserted into the receiving space 13. In this case, the inner eccentric 14 is inserted in an outer eccentric 15. The two eccentrics 14 and 15 fill the receiving space 13.

A first arm 17 extending in the radial direction is arranged on the inner eccentric 14. The arm is located opposite a second arm 18 which is of mirror-symmetrical design and is provided on the external, second eccentric 15. If first arm 17 and second arm 18 are moved toward each other, then the overall eccentricity of the two eccentrics 14 and 15 is increased. Conversely, the overall eccentricity is reduced if first arm 17 and second arm 18 are moved apart. An inoperative position of the adjustment fitting 1 is illustrated. In this case, the first arm 17 and the second arm 18 are moved toward each other by a coupling element (not illustrated here). By means of the overall eccentricity which is increased by this means, the revolving wheel 7 engages in the central wheel 6 in a play-free manner.

First structures 20 and second structures 22, in each case in the form of pins and spaced apart radially from one other, are arranged on the first arm 17 and on the second arm 18, respectively. For actuation of the adjustment fitting 1, a transmission element 25 which rests on the eccentrics 14 and 15 is provided. The transmission element 25 is mounted rotatably about the central axis 9 by means of an elongated hole 26. The transmission element 25 furthermore has an engagement mechanism 27 which is designed as a radially extending finger and lies between the first structures 20 and the second structures 22. Opposite the engagement mechanism 27, an edge 29 is integrally formed on the transmission element 25, the edge serving to be carried along by a driving element, such as in particular a hand wheel.

If the transmission element 25 is rotated by the edge 29 being carried along, the engagement mechanism 27 tilts between an outer and an opposite, inner structure of the structures 20 and 22 irrespective of the direction of rotation. This tilting is made possible by the longitudinal displacement of the transmission element 25 by means of the elongated hole 26. By means of this movement, the first arm 17 and the second arm 18 open opposite each other, thus reducing the overall eccentricity of the eccentrics 14 and 15. The eccentrics 14 and 15 can be rotated together in the receiving space 13, and therefore the first fitting part 3 rotates with a corresponding speed ratio in relation to the second fitting part 4, or vice versa.

Figure 3:
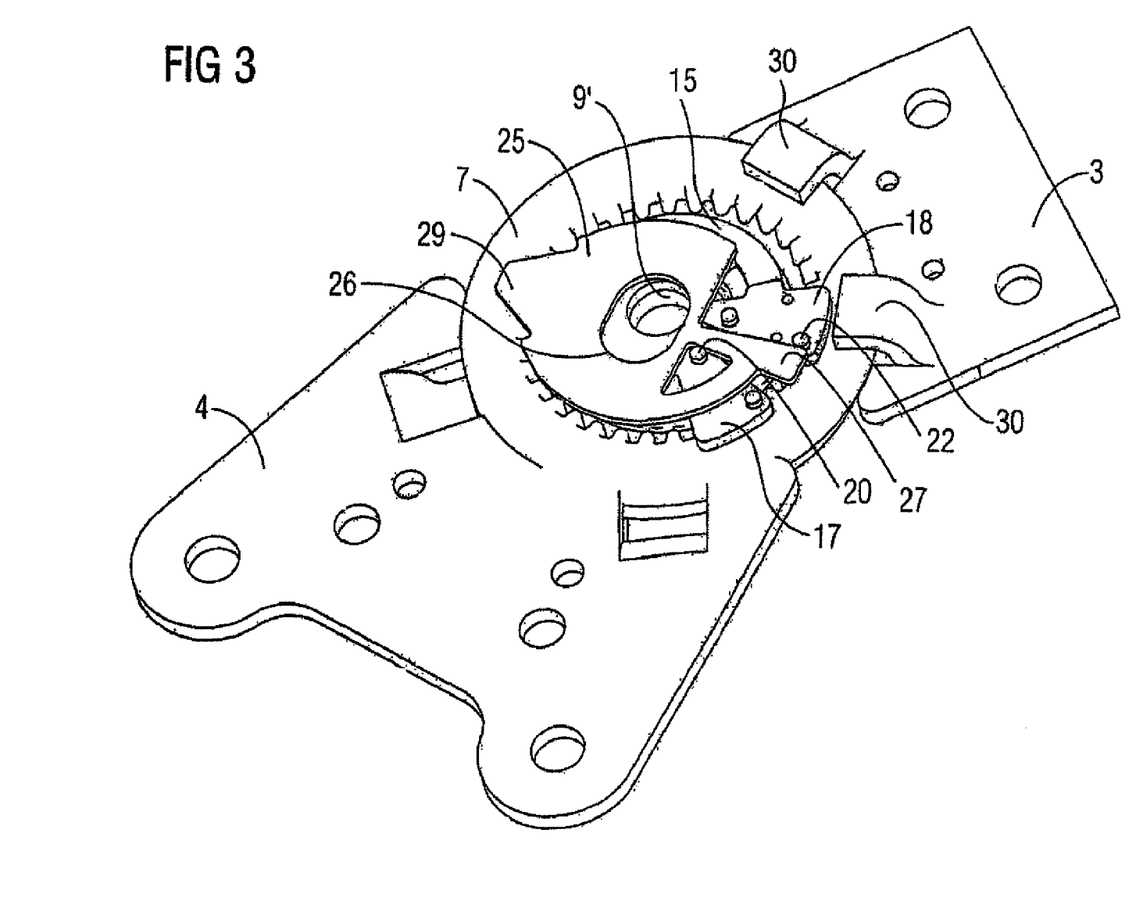
FIG. 3 shows the adjustment fitting according to FIG. 1 with the eccentrics inserted, in an actuating position.

To clarify the movement of the transmission element 25, the adjustment fitting 1 is illustrated in FIG. 3 in an actuation position. It is clearly seen that the transmission element 25 has been rotated counterclockwise, with the elongated hole 26 bearing against the inner bore 9' through which a corresponding shaft is guided in the installed state. The finger of the engagement mechanism 27 presses the outer of the structures 22 and the inner of the structures 20 apart, thus reducing the overall eccentricity of the eccentrics 14 and 15. In contrast to FIG. 2, two overlapping elements 30 which overlap the revolving wheel 7 are shown for the first fitting part 3. The revolving wheel 7 is guided in the overlapping elements 30 in a manner permitting a wobbling movement.

Figure 4:
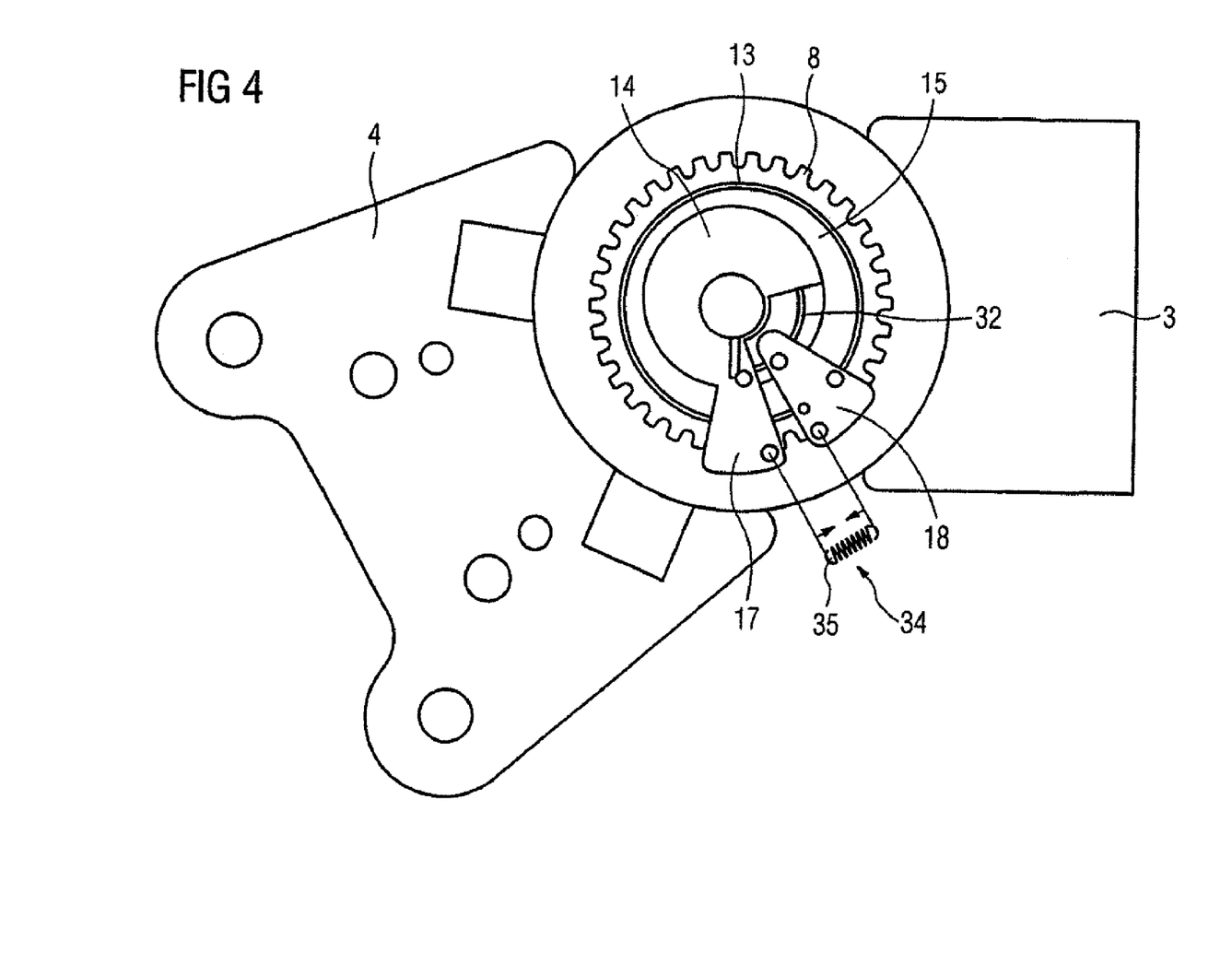
FIG. 4 shows the adjustment fitting according to FIG. 1 with a detailed view of the eccentrics.

FIG. 4 shows a detailed view of the first eccentric 14 and of the second eccentric 15, which are arranged in the receiving space 13, as an illustration. The transmission element 25 is not shown for this.

It can be seen that the first arm 17 is assigned to the inner, first eccentric 14 and the second arm 18 is assigned to the outer, second eccentric 15. In order to permit a relative rotation of the two eccentrics 14 and 15 in relation to each other, the inner, first eccentric 14 has a recess 32 in which an inwardly extended subsection of the second arm 18 can be rotated. For clarification, the coupling element 34 is furthermore illustrated symbolically, the coupling element comprising a mechanical spring 35 which moves the first arm 17 and the second arm 18 toward each other.

Figure 5:
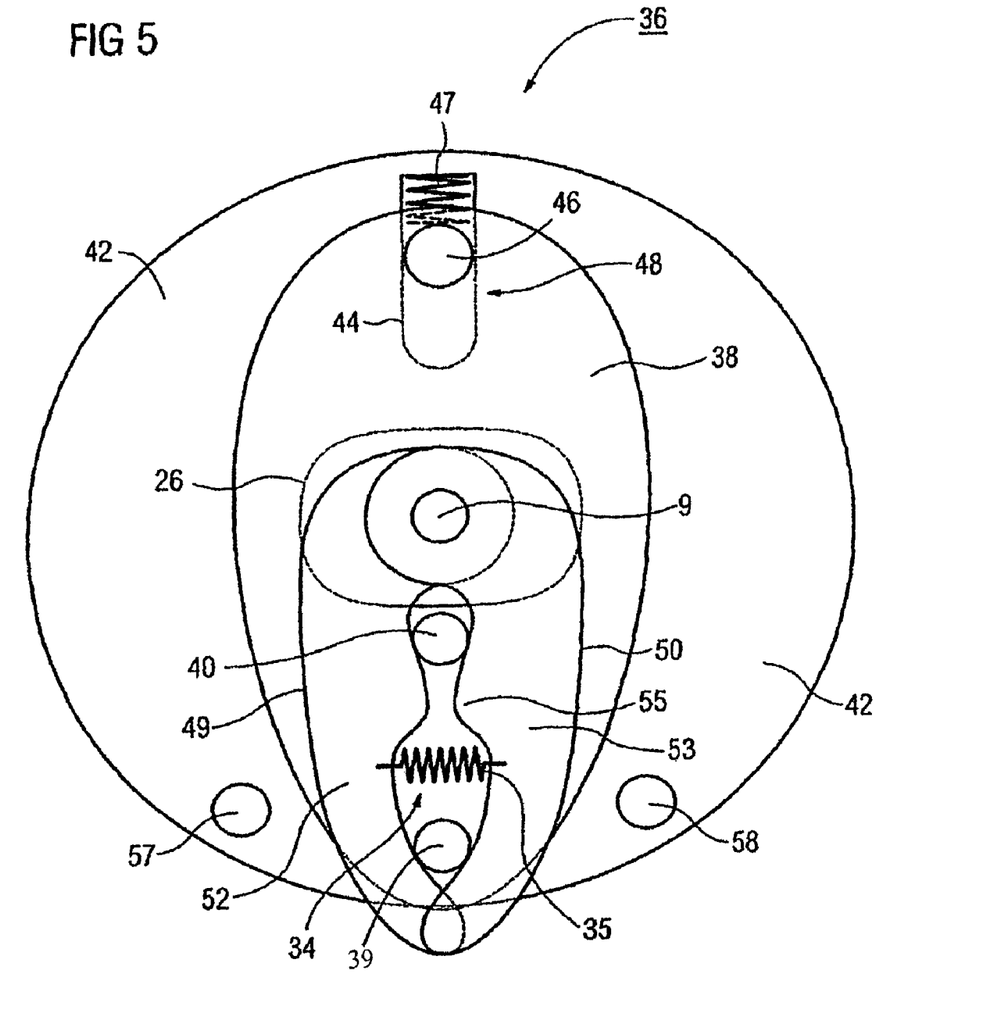
FIG. 5 shows an adjustment fitting with nipper-shaped carry-along mechanisms of the eccentrics.

FIG. 5 illustrates, schematically, a further adjustment fitting 36 in a top view. In accordance with what has been said previously, a transmission element 38 which comprises carry-along structures 39 and 40 as engagement means can be seen. The transmission element 38 is mounted in a rotatable manner about the central axis 9 and in a longitudinally displaceable manner by means of an elongated hole 26. A driving element 42 is provided for driving the transmission element 38, the driving element having a driver 44 which is designed as an elongated hole and in which a structure 46 which is connected to the transmission element 38 is guided. The structure 46 is supported in the driver 44 by means of a spring 47, thus overall forming an adjusting element 48 which presses the transmission element 38 according to FIG. 5 downward.

The eccentricities (not visible) have a centrally acting, first and second carry-along mechanisms 49 and 50 which are respectively designed as a first nipper limb 52 and as a second nipper limb 53. In this case, the nipper limbs 52 and 53 are curved outwards and such that they taper toward each other and are pulled toward each other by means of a spring 35 which forms a coupling element 34. If the first nipper limb 52 and the second nipper limb 53 are opened opposite each other, then the overall eccentricity of the eccentrics is reduced. The situation shown illustrates an inoperative position in which the overall eccentricity is increased.

If the driving element 42 is rotated, for example, counterclockwise, then the structure 39 moves against the second nipper limb 53. Owing to the counterforce resulting because of the spring 35, the transmission element 38, in the process, is displaced to the left with respect to the central axis 9 by means of the elongated hole 26. The resulting tipping movement finally causes the structure 40 to be pressed against the first nipper limb 52 which has a thickened portion 55 at this point. Ultimately, the two nipper limbs 52 and 53 are thereby opened in relation to each other, thus reducing the overall eccentricity of the eccentrics such that the transmission element 38 and therefore the adjustment fitting 36 as a whole can be actuated.

In addition, the driving element 42 has stops 57 and 58 which are provided for carrying along the transmission element 38.

Figure 6:
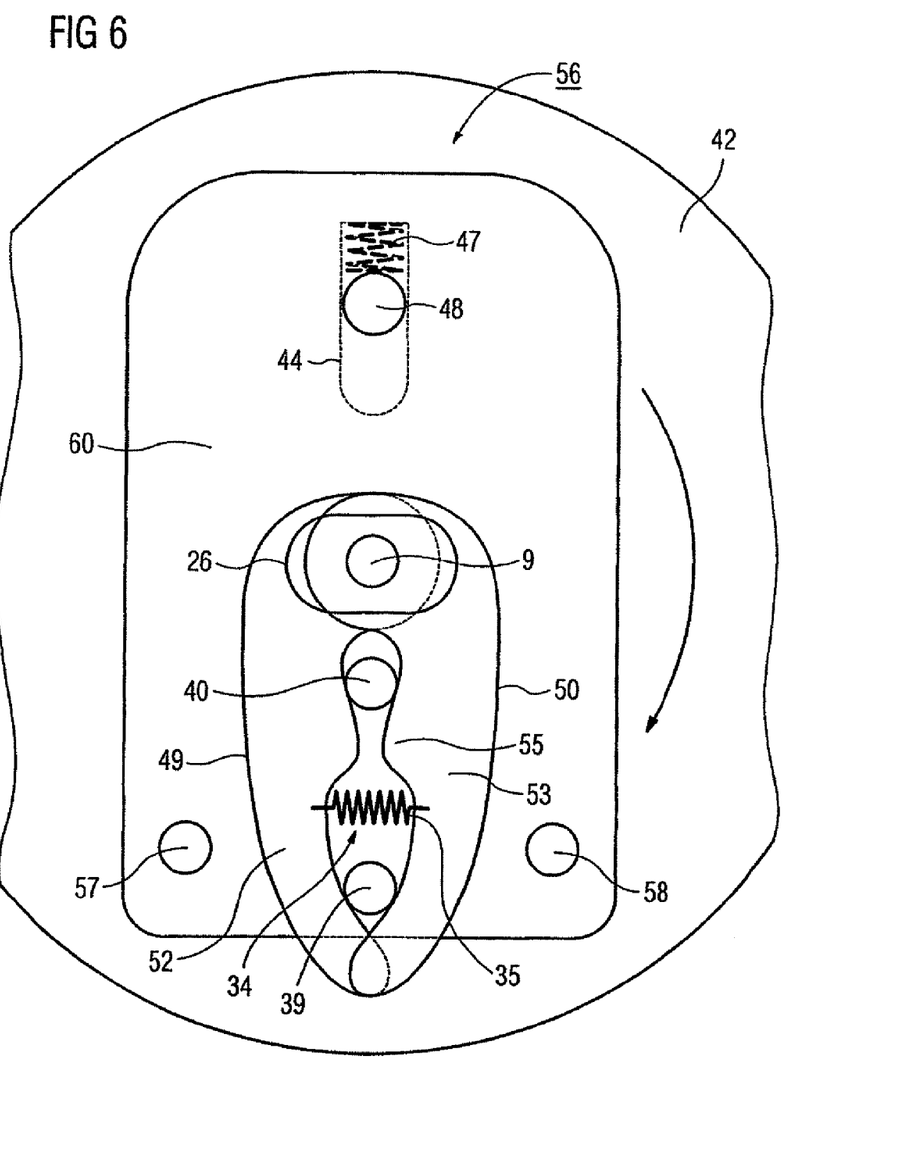
FIG. 6 shows an alternative configuration of the adjustment fitting according to FIG. 5.

FIG. 6 illustrates a further adjustment fitting 56 schematically in a top view. The adjustment fitting 56 differs from the adjustment fitting 36 illustrated in FIG. 5 by virtue of a different design of the transmission element 60.

In this case, the stops 57 and 58 are not assigned to the driving element 42 but rather to the transmission element 60. The transmission element 60 is driven solely via the driver 44. Also in the case illustrated, upon rotation of the transmission element 60 the two nipper limbs 52 and 53 open in relation to each other to such an extent that they bear against the respective stops 57 and 58. Rotation of the eccentrics also takes place via said stops 57 and 58.

What is claimed is:

1. An adjustment fitting for a vehicle seat, the adjustment fitting comprising
    a first fitting part;
    a second fitting part;
    a wobble mechanism connecting the first and second fitting parts to each other in a rotationally adjustable manner, wherein the wobble mechanism comprises
        a central wheel that is rotatable about a central axis and is connected to the first fitting part, and
        a revolving wheel that is arranged in the interior of the central wheel eccentrically with respect to the central axis and is connected to the second fitting part, wherein the central wheel and the revolving wheel form, with respect to each other, an eccentric receiving space in which a first eccentric and a second eccentric are arranged rotatably in relation to each other, thereby forming a variable eccentricity,
        a transmission element that has an engagement mechanism and is rotatable about the central axis, wherein the transmission element actuates the first and second eccentrics; and
        a coupling element that brings the first and the second eccentrics with respect to each other into a position with increased overall eccentricity, in which the revolving wheel engages in a play-free manner in the central wheel and with the transmission element;
    wherein the eccentrics each have a carry-along mechanism with which the engagement mechanism interacts,
    wherein the transmission element is additionally mounted movably in the plane of the fitting parts, with the engagement mechanism substantially extending in said plane and, when actuated, acting on both carry-along mechanisms counter to the coupling element, such that the eccentrics are brought into a position with reduced overall eccentricity, in which the revolving wheel engages with play in the central wheel.

2. The adjustment fitting according to claim 1, wherein the engagement mechanism is designed as a radially extending pointer, and wherein the carry-along mechanism of the eccentrics is formed in each case by means of two structures each arranged on one side of the pointer.

3. The adjustment fitting according to claim 1, wherein the eccentrics each have an arm that extends radially beyond a circumference and on which the carry-along mechanism is arranged in each case.

4. The adjustment fitting according to claim 1, wherein the transmission element has an elongated hole for displaceability formation.

5. The adjustment fitting according to claim 1, wherein the coupling element is formed by a mechanical spring.

6. The adjustment fitting according to claim 1, wherein the carry-along mechanism of the eccentrics is in each case formed by an essentially radially extending nipper limb, and wherein the engagement mechanism comprises two structures that are spaced apart from each other in a radial direction and are arranged between the nipper limbs of the eccentrics.

7. The adjustment fitting according to claim 6, wherein the transmission element has a stop for each nipper limb, with the nipper limbs each being arranged between the structures and the associated stop.

8. The adjustment fitting according to claim 6, wherein the structures are formed as pins.

9. The adjustment fitting according to claim 6, wherein the nipper limb is thickened toward one of the structures in the vicinity of the adjustment fitting.

10. The adjustment fitting according to claim 6, wherein a plurality of ends of the nipper limbs taper toward each other, and wherein a radially acting adjusting element is provided for eliminating play between the transmission element and the nipper limbs.

11. The adjustment fitting according to claim 10, wherein a driving element is provided with a driver for actuating the transmission element.

12. The adjustment fitting according to claim 11, wherein the adjusting element is supported on the driver.

\* \* \* \* \*